April 12, 1949.                P. M. GRIFFIN                    2,467,305
                              DIFFERENTIAL ENGINE
                            Filed July 24, 1944

INVENTOR.
Percy M. Griffin
BY
                                   ATTORNEY

Patented Apr. 12, 1949

2,467,305

UNITED STATES PATENT OFFICE 2,467,305

DIFFERENTIAL ENGINE

Percy M. Griffin, Albany, N. Y., assignor to Consolidated Car-Heating Company, Inc., Albany, N. Y., a corporation of New York Application July 24, 1944, Serial No. 546,383

3 Claims. (Cl. 121—44)

My invention relates to fluid actuated engines of the differential pressure type and particularly but not exclusively to a direct stroke hydraulic engine adapted to operate doors of cars, busses and the like.

One of the objects of my invention is to provide an engine of this type which is adapted to be directly connected to and to oscillate a crank arm or lever about a fixed axis. Another object is to provide an engine of this type having a simple means for positively controlling the piston speed thereof throughout the major portion of the piston stroke and which may be easily adjusted or changed to vary such speed, and readily adjustable or changeable means for checking or reducing the piston speed throughout the balance of the piston stroke.

The time within which a bus or car door must be opened or closed, varies with different specifications, and it is extremely desirable that, once the door operator is adjusted to function at the required speed, it will long continue to function at that speed without further adjustment. Hence, another object of my invention is to provide a device of this character which, except for two small speed controlling parts, may be standardized throughout, and can be set to operate, and will operate for indefinitely long periods, at any predetermined speeds by simply selecting and installing the proper speed controlling parts which, likewise, may be standardized.

With these objects in view my invention includes the novel arrangement and combination of elements described below and illustrated in the accompanying drawing in which—

Fig. 1 is a fragmentary top plan view of my engine;

Fig. 2 is a fragmentary longitudinal section of the engine;

Fig. 3 is a side elevation view of a detail;

Fig. 4 is an end view of the detail shown in Fig. 3; and

Fig. 5 is a fragmentary small scale view of the engine showing the piston rod directly connected to a crank arm, and a valve and fragmentary portions of the piping for controlling the operation of the engine.

Referring to the drawings, my engine comprises a cylinder 1 provided in the opposite ends thereof with internal pipe threads 2 and 3 adapted to receive the threaded plugs 4 and 5 respectively. A piston 6 having a piston rod 7 thereon is slidably fitted in the bore of the cylinder and is adapted to be reciprocated therein by fluid pressure. The piston rod 7 extends through the plug 5, and a gland 8 which is secured to the end member 5 by means of the screws 9 serves to compress the packing 10 about the piston rod. The piston rod is drilled axially thereof to form a recess for housing the helical spring 11 which normally holds the plunger 12 in the position shown in Fig. 2; the plunger and spring being secured in place by means of the split, threaded bushing 13. Between the piston rod and the head of the piston is a shoulder 14 which abuts the end member 5 and serves as a stop for the piston.

The other end of the cylinder is closed by the threaded plug 4 having a longitudinally extending passage therethrough which communicates with a longitudinal passage in a second plug 16 which, in turn, is threaded into the outer end of the plug 4. The plug 16 is tapped at its outer end and closed by the pipe plug 17. The plug 16 is also provided with two other pipe threaded passages 18 and 19 one of which is closed by plug 20 and the other of which forms a passage for fluid to and from the cylinder on one side of the piston. Two plugs 4 and 16 are not really necessary, but are used to facilitate the proper positioning of the passage 18 with respect to the fluid piping to be connected thereto and to insure that the plugs are, at the same time, tight.

The plug 4 on its inner end is provided with a portion 21 of reduced diameter which extends into the bore of cylinder 1 in spaced relation thereto. This portion is provided with spaced transverse fluid passages 22 and 23 extending from the exterior thereof to the central passage therethrough. The passage through the plug 4 and the extended portion thereof is continuous but is reduced in size at a point intermediate the ends thereof, as shown at 24, and the ends of this reduced portion form valve seats for the closure elements 25 and 26 which are slidably fitted in the passage extending through the plug 4. Both of these closure elements are provided with a longitudinal passage, 27 and 28, respectively, extending therethrough and adapted to permit passage of fluid at all times irrespective of the position of the closure element. The passages 27 and 28 throughout the major portion thereof may be of substantially any diameter, but at the valve seat ends they are accurately drilled to a reduced, predetermined diameter which controls the rate of fluid flow therethrough. For a short distance from their seating ends the closure elements are reduced somewhat in outside diameter and are provided with transverse fluid passages 29 and 30, respectively, extending from the exterior of the reduced portion to the longitudinal passage through the closure element.

The closure element 25 is freely slidable in the passage through the plug 4 and is secured therein by means of the split bushing 31 which is threaded into the passage. Thus, by removing the pipe plug 17 and inserting a screw driver in the slotted end of the bushing 31 the extent to which the closure element 25 can move away from its seat may be varied. The closure element 26 is secured in position by means of a similar, slotted bushing 32, by means of which its movement away from its seat may be varied, and this closure element is normally held in valve opened position by means of the light helical spring 33.

A suitable base 34 for the engine is provided with a trunnion pin 35 secured therein, and a removable cap 36, having a trunnion pin 37 therein, is secured to the base by means of the cap screws 38 and 39. These pins are received in bushed recesses 40 and 41 in the cylinder and there is thus provided an axis about which the engine may oscillate.

In Fig. 5, I have shown in a fragmentary, small scale view an operating valve 42, a pipe 43 which communicates with the passage 44 in the cylinder 1 and is filled with a liquid at all times under substantial pressure from an accumulator, not shown; a pipe 45 which provides communication between the valve 42 and a sump from which liquid is pumped into the accumulator by a pump, not shown; a pipe 46 which provides communication between the valve and the passage 18 in the plug 16; and a pipe 47 providing communication between valve 42 and pipe 43. Since the engine oscillates on the trunnions, the pipes which are connected thereto must have flexible sections at least adjacent the engine.

The valve 42 is understood to be of the three-way type which in one position, provides communication between pipes 43, 47 and 46 with pipe 45 cut off and, in the other position, cuts off communication between pipes 47 and 46 and establishes communication between pipes 45 and 46.

The piston rod 7 is pivotally, directly connected to the crank 48, as shown at 49, and it is to be understood that the crank 48 oscillates about a fixed axis 50.

To provide for bleeding air from the cylinder a plug 51 is provided in the top thereof adjacent the passage 44.

Assuming the parts to be in the relative positions shown in Fig. 2, which is the door-closed position, and the valve 42 in the position which provides communication between pipes 43, 47 and 46, liquid under the same pressure is in the cylinder on both sides of the piston 6. However, since the area presented by the left hand side of the piston, as viewed in Fig. 2, to the pressure which tends to move the piston to the right is greater than that area presented by the right hand side of the piston to the pressure which tends to move it to the left, the piston will be held in the position shown.

When the valve 42 is moved to the other position, to open the door, and in which said position communication between pipes 46 and 47 is cut off and communication between pipe 45 and pipe 46 is established, that portion of the cylinder to the left of the piston is placed in communication with the sump and the pressure is relieved therein. The pressure on the right hand side of the piston will then move it to the left and exhaust or expel the fluid in the cylinder to the left of the piston into the sump. As the piston 6 moves to the left, liquid in the cylinder to the left of the piston is forced through the passage 28 in the closure element 21 and also around the closure element through the passages 22 and 24. This movement of fluid through the passage 24 will force the closure element 25 to the left and away from its seat until it strikes the inner end of the bushing 31. Thus fluid may pass not only through the small diameter passage in the seating end of the closure element 25 but also around the end of element 25 and through the transverse passage 29 and passage 27, in this element through the bushing 31, and thus out through pipe 46, valve 42 and pipe 45 to the sump. The passages through which the fluid flows as described above are, in the aggregate, of fairly large cross-sectional areas hence the movement of piston 6 to the left is initially, at least, comparatively fast. However, the rate at which the piston moves to the left to open the doors is controlled by the distance which the closure element 25 may move from its seat, and this may be varied by moving bushing 31 as described above.

As the piston 6 approaches the end of its door-opening stroke, plunger 12 passes into bushing 32 and finally contacts the right hand end of the closure element 26 forcing it to the left against the compression of the spring 33, into its seat. Thereafter the spring 11 is compressed until the left hand movement of the piston stops. When the closure element 26 is seated, transverse passage 30 extending therethrough is brought into registration with the transverse passage 22 so that fluid entering these passages and passage 28 cannot escape except through the passage of reduced cross-sectional area in the seating end of element 26. Due to the resistance offered to the flow of fluid through this small area passage the rate of travel of piston 6 to the left is substantially checked or reduced so that for the balance of its left hand stroke the movement is comparatively slow. Thus, slamming open of the doors is prevented.

When the valve 42 is turned to its other position so that communication with the sump through pipe 45 is cut off and communication is reestablished between pipes 43 and 46 through pipe 47 and the valve, fluid under high pressure flows into the passage 18 in plug 16 passing through the bushing 31 into the passage 27 in closure element 25 and forcing closure element 25 to the right and against its seat. Thereafter the incoming fluid must pass through the restricted passage in the seating end of element 25. At this moment closure element 26 is seated due to the constant pressure of the fluid in the cylinder to the right of the piston which holds the plunger against it, but the fluid pressure against the seated end of element 26 will unseat it against the compression of spring 11 and thus open the check valve so that fluid can pass into the cylinder both through the passage 28 in element 26 and also through the transverse passage 22 in the extended portion of plug 4. Since the area presented by the left side of the piston 6 to pressure tending to move the piston to the right is greater than the area presented by the right hand side of the piston to the constant fluid pressure in the cylinder on that side of the piston, the piston will be forced to the right and the fluid on the right hand side of the piston will be forced back and out through passage 44 into pipe 43 and back into the accumulator.

From the foregoing it will be apparent that closure element 25 controls both the opening and closing speed of the door. The closing speed is fixed and depends on the diameter of the fluid passage at the seating end of element 25. To change the closing speed, element 25 is changed. On the other hand, the opening speed (before it is checked) may be varied by varying the distance which element 25 may move from its seat.

The element 26 controls the checking of the door opening movement of the piston which is fixed by the diameter of the fluid passage in the seating end thereof.

Thus, there are no parts which are subject to rapid wear. Once the closure elements are assembled in the plug 4 to provide a predetermined rate of door opening, closing and checking for a given fluid pressure, it is only necessary to use a plug 4 assembly having the desired time characteristics in any engine in order to have it operate at the desired rates.

While I have described my invention in its preferred embodiment it is to be understood that the words which I have used are words of description rather than of limitation and that changes within the purview of the appended claims may be made without departing from the true scope and spirit of my invention.

What I claim is:

1. A fluid actuated engine of the differential pressure type comprising a cylinder, a piston having a piston rod on one end thereof and mounted to reciprocate in said cylinder; said cylinder being provided with a first fluid passage communicating therewith on the rod side of said piston and a second fluid passage communicating therewith on the other side of said piston; said second passage being provided with two valves having closure elements provided with restricted passages therethrough slidably mounted therein; said restricted passages provided continuous communication between said second fluid passage and the cylinder on said other side of said piston; one of said closure elements being adapted to be moved into valve closed position by and substantially contemporaneously with the starting of the inflow of fluid in said second passage and into valve opened position by the outflow of said fluid; means normally holding the other of said closure elements in valve opened position, and means on said piston adapted to cooperate with said other closure element when said piston approaches the end of its stroke in one direction for moving said other closure element in to valve closed position to confine the flow of fluid therethrough to the restricted passage therein.

2. In a fluid actuated engine of the differential pressure type, the combination with a cylinder, of a piston mounted to reciprocate therein and presenting surfaces of substantially different area on the opposite sides thereof to fluid pressure in said cylinder; said cylinder being provided with a first passage for the flow of fluid to and from said cylinder on the side of said piston of larger area and a second passage adapted to place said cylinder on the other side of said piston in constant communication with a source of fluid under pressure; a valve for controlling the rate of flow of fluid in both directions in said first passage and comprising a closure element closely fitted but freely slidable in said passage and adapted to be moved in the direction of fluid flow in said passage by said fluid, a seat with which said closure element is moved into valve-closed cooperative relation substantially simultaneously with the entrance of said fluid from said passage into said cylinder; said closure element being provided with a passage therethrough of restricted area for controlling the rate of fluid inflow into said cylinder throughout the interval when said valve is closed; a second valve having a closure element closely but slidably fitted in said first passage and provided with a passage adapted to permit a limited flow of fluid through said valve at all times, means normally holding said valve in open position, and means carried by said piston and cooperating with said last mentioned closure element to close said second valve as said piston nears the end of its exhausting stroke.

3. In a fluid actuated engine of the differential pressure type including a cylinder and a piston mounted to reciprocate therein; said cylinder being provided with a passage for the flow of fluid to and from said cylinder; a valve controlling the flow of said fluid in each direction comprising a closure element mounted to slide freely in said passage and adapted to be moved in the direction of fluid flow in said passage by said fluid, and a seat for said closure element; said closure element being provided with a passage adapted to permit a limited flow of fluid through said valve at all times, and a second passage adapted to permit an additional flow of fluid through said valve when said valve is open; a second valve having a closure element mounted to slide in said passage and provided with a passage adapted to permit a limited flow of fluid through said valve at all times, means normally holding said second valve closure element in open position, means for varying the extent to which said closure element of said second valve may move in said passage, and means carried by said piston and cooperating with said last mentioned closure element to close said second valve as said piston nears the end of its fluid exhausting stroke.

PERCY M. GRIFFIN.

REFERENCES CITED

The following references are of record in the file of this patent:

UNITED STATES PATENTS

| Number | Name | Date |
| --- | --- | --- |
| 847,834 | Sears | Mar. 19, 1907 |
| 917,642 | McElroy | Apr. 6, 1909 |
| 1,737,433 | Rowntree | Nov. 26, 1929 |
| 1,905,065 | Scholl | Apr. 25, 1933 |
| 1,971,048 | Parsons | Aug. 21, 1934 |
| 2,115,845 | Forman | May 3, 1938 |
| 2,166,699 | Anderson | July 18, 1939 |
| 2,194,374 | Wünsch | Mar. 19, 1940 |
| 2,324,224 | Meredith | July 13, 1943 |